US006772396B1

(12) United States Patent
Cronin et al.

(10) Patent No.: US 6,772,396 B1
(45) Date of Patent: Aug. 3, 2004

(54) CONTENT DISTRIBUTION SYSTEM FOR NETWORK ENVIRONMENTS

(75) Inventors: Dennis G. Cronin, Bellevue, WA (US); Michael G. Dryfoos, Kenmore, WA (US); Jong S. Huang, Bellevue, WA (US); Mark T. Quenneville, Bellingham, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/415,195

(22) Filed: Oct. 7, 1999

(51) Int. Cl.[7] .......................... G06F 17/30; G06F 13/00
(52) U.S. Cl. ..................... 715/523; 715/517; 715/513; 345/629
(58) Field of Search ............................. 707/523, 517, 707/513; 345/629, 760, 788; 715/500.1, 517, 523, 524, 513

(56) References Cited

U.S. PATENT DOCUMENTS

| 5,864,871 A | * | 1/1999 | Kitain et al. ............. 707/104.1 |
| 5,892,909 A | * | 4/1999 | Grasso et al. ................ 709/201 |
| 5,937,162 A | * | 8/1999 | Funk et al. .................. 709/206 |
| 6,029,182 A | * | 2/2000 | Nehab et al. ................ 715/523 |
| 6,477,532 B1 | * | 11/2002 | Duliege ........................ 707/10 |

OTHER PUBLICATIONS

"Getting Started with XSL," http://msdn.microsoft.com/xml/XSLGuide/xsl–overview.asp, Microsoft Corporation, 2 pages, Aug. 26, 1999.
Bos, "XML in 10 points," http://www.w3.org/XML/1999/XML–in–10–points, 3 pages, created Mar. 27, 1999 and updated Dec. 8, 1999.
Lilley et al., "Extensible Stylesheet Language (XSL)," http://www.w3.org/Style/XSL/, 6 pages, Aug. 28, 1999.
Bray ed., "Extensible Markup Language (XML) 1.0," http://www.w3.org/TR/REC–XML, W3C, 41 pages, Feb. 10, 1998.
Connolly et al., "Extensible Markup Language (XML)," http://www.w3.org/XML, 5 pages, May 7, 1999.

\* cited by examiner

*Primary Examiner*—Stephen S. Hong
*Assistant Examiner*—Matthew Ludwig
(74) *Attorney, Agent, or Firm*—Klarquist Sparkman LLP

(57) ABSTRACT

A method and apparatus for republishing content to multiple target server computers such that the content is automatically customized for each target site. Users on client computers can then view the customized content by connecting to the target sites through the Internet or another network. In one aspect, a source site receives content from one or more journalist client computers and automatically republishes the content to multiple target sites. The source site includes a database engine having procedures stored thereon that contain the custom section hierarchy of the target sites. The custom section hierarchy is used to map a story on the source site to any predetermined section on the target site. In another aspect, a difference engine determines stories that need to be republished by comparing a list of potential stories to be republished to a list of stories already published on a target site. This comparison includes analyzing time stamps and a browse order of the stories in both lists and only republishing stories that have changed. In another aspect, a binder is used to further customize the stories for each target site. The binder applies style sheets containing customization information to the stories. The style sheets change the look and feel of the story to customize the story for the target site. For example, the style sheets can be used to customize the location of a picture, add a header, add a deck, customize the font, etc. In yet another aspect, a status table is used to track each republication job as content is customized for each target site. The status table allows multiple jobs to be republished simultaneously either through parallel processing or multithreading.

30 Claims, 15 Drawing Sheets

FIG. 5

TARGET 112

Farmers can blame La Niña ~132

News
Business
Sports
Local
Health
Technology
Living · Travel
TV News
Opinions
Weather
Shopping
MSN.COM

130

Sen. Robert Byrd, D-W.Va. Left farmer Terry Dunn, Sen. Jay Rockefeller, D-W.Va. and Agriculture Secretary Dan Glickman look at a drought-damaged cornfield in Charles Town, —136
W.Va., on Monday.
MSNBC STAFF AND WIRE REPORTS Video

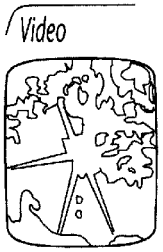

Nightly News

Select your connection speed

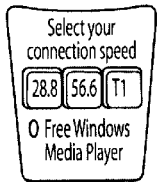

○ Free Windows Media Player

NBC's David Bloom reports Monday on the Mid-Atlantic drought that could become the worst this century
—134

Aug. 3 — Lawmakers met Tuesday to discuss ways to help drought-stricken farmers in Mid-Atlantic states, but one variable they won't be able to control is what has made the three-year drought there even worse. It's the same factor credited for a world-record 95 feet of snow in

—138

 Internet zone

FIG. 6

TARGET 114 msn Microsoft

MSNBC News

GO TO msn.com

— 140

| News Home | International News | U.S. News | Special Reports | In Today's Newspapers |

MSNBC

Click to go to
www.msnbc.com

**DAILY FEATURES
ON MSNBC.COM**
o Scoop: Michael
  Jackson doesn't rock
  so bad
o The Comics
o Live video: Watch
  news as it breaks o Show me my local
  news, sports and
  weather on MSNBC

Farmers can blame La Niña —132

6 states beseiged by 1930s Dust Bowl conditions —142

MSNBC STAFF AND WIRE REPORTS

Aug. 3 — Lawmakers met Tuesday to discuss ways to help drought-stricken farmers in Mid-Atlantic states, but one variable they won't be able to control is what has —144 made the three-year drought there even worse. It's the same factor credited for a world-record 95 feet of snow in Washington state last winter. No, it's not El Niño but La Niña, the climatic phenom that's quickly becoming as infamous as its sibling.

STORY CONTINUES BELOW

ADVERTISING ON MSNBC ON MSN

Internet zone

INDEX FILE CREATED BY EXPORT MANAGER

MASTER INDEX

DIFFERENCE INDEX

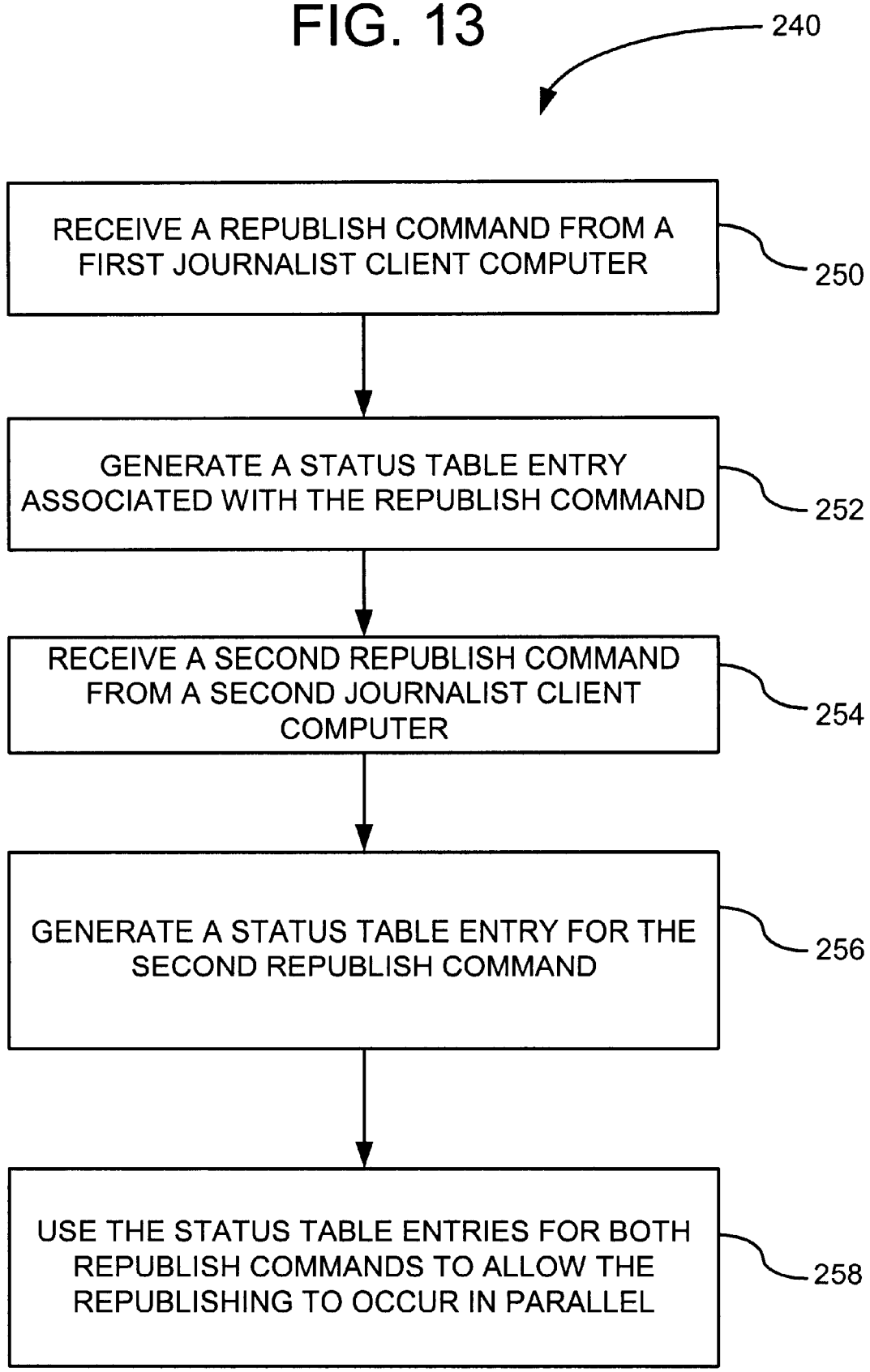

CONTENT DISTRIBUTION SYSTEM FOR NETWORK ENVIRONMENTS

FIELD OF THE INVENTION

The present invention relates generally to distributing content (text, images, etc.) on a network, and more particularly to distributing content to multiple target sites having different site hierarchies and/or different content layouts.

BACKGROUND OF THE INVENTION

The Internet is a worldwide collection of cooperating computer networks. A user typically accesses the Internet through a "client" computer. The client computer communicates with a "server" computer on a remote computer network using telephone, ISDN, or T1 lines or similar physical connections. The server computer may download content to the client computer for viewing or execution by the user.

The client and server computers communicate through software protocols, such as File Transfer Protocol (FTP), Simple Mail Transfer Protocol (SMTP), Hypertext Transfer Protocol (HTTP), Gopher, etc. Currently HTTP is the most widely used protocol and is used for accessing the World Wide Web. The World Wide Web is a portion of the Internet consisting of server computers, also referred to as "sites," which make multi-media documents (often referred to as content) generally available for downloading or retrieval by individuals having a computer with Internet access. The documents are generally created in Hypertext Markup Language (HTML) and displayed on a user's computer.

One advantage of the Internet is immediate and up-to-date access to information, such as news, sports, stock prices, etc. Many sites, such as MSNBC, ZDNet, SNAP, etc., publish content several times per hour. Users viewing such content know that they are viewing the latest information available on any given topic. Many of the sites have staff reporters that create some of the published content, but other content is purchased from third-party news sources. For example, MSNBC sells content to other content publishers, such as MSN, ZDNet, etc., for display on their sites. Additionally, major newspapers, such as the Wall Street Journal, and other news publications sell content to sites.

Each of the sites is organized differently and/or has a different look and feel for displaying content. That is, different sites may have different section hierarchies (e.g., headings and stories under the headings) and different story layouts (arrangement of words, images, etc. for the stories). The different look and feel is particularly apparent when content designed for a full-size monitor is displayed on a hand-held device. Typically, content for a full-size monitor has one or more pictures associated with the content, while a hand-held device uses only text when displaying content.

A problem with purchasing content from third-party sources is that the content has the look and feel of the source site (the site supplying the content), rather than the target site (the site receiving the content). Consequently, a site supplying content must quickly reformat the content before sending it to a target site so that the content has the look and feel of the target site. Additionally, the source site must determine where the content should be located in the site hierarchy for the target site. For example, the same story may be located under a section "other sports" on one target site and under "tennis" on another target site.

Another problem is that target sites have restrictions on content that can be displayed based on licensing agreements with third-party content providers. Thus, a source site must ensure that the target site does not receive content that it cannot legally display.

Currently, the necessary work required to supply content to multiple target sites is labor intensive. There are publishing tools, such as Adobe Pagemaker 6.5 Plus, that allow content to be saved as different file types, such as HTML or PDF. However, selecting these file types does not affect the look and feel of the content. Instead, it allows the content to be displayed using different software applications. For example, an HTML document can be displayed in a browser, while a PDF document can be displayed in Adobe Acrobat. However, both software applications display essentially identical documents in terms of the document's layout.

It is desirable, therefore, to provide a system and method wherein content is distributed to multiple target sites taking into account the target site's hierarchy and/or look and feel.

SUMMARY OF THE INVENTION

A method and apparatus is disclosed that allows for republication of content to multiple target sites in a customized format for each target site. Users on client computers can then view the customized content by connecting to the target sites through the Internet or other network.

In one aspect, a source site receives content (e.g., stories) from a journalist client computer and automatically republishes the content to multiple target sites. The source site includes a database engine having stored procedures thereon containing the custom section hierarchy of the target sites. The custom section hierarchy for a given target site is used to map a story on the source site to any desired section on the target site. Thus, different target sites can have the stories displayed under different section headings.

In another aspect, the source site includes a difference engine that analyzes time stamps and a browse order of stories already published to determine whether a story needs to be republished. Typically, a source site is instructed to republish an entire section of stories even though some of the stories have not changed on the target site. The difference engine determines the stories in the section that have changed by analyzing a master index file indicating the current state of the target site. Only stories that have changed since the last publication are republished.

In another aspect, the story layout for each target site is customized. Style sheets containing customization information for the stories are used for the customization. The style sheets can be used to customize the location of a picture, add a header, add a deck, customize the font, etc. In the illustrated implementation, the stories are converted to an XML file type and XSL style sheets are used for the customization. Other file types and style sheets also may be used.

In yet a further aspect, a status table is used to track each republication job as content is customized for each target site. The status table allows multiple jobs to be republished simultaneously either through parallel processing or multi-threading.

Further features and advantages of the invention will become apparent with reference to the following detailed description and accompanying drawings.

BRIEF DESCRIPTION OF THE DRAWINGS

FIG. 5 is an illustration of content displayed on one of the target server computers of FIG. 4 in a customized format.

FIG. 6 is an illustration of the same content shown in FIG. 5, but on a different target server computer with a different customized layout.

FIG. 13 is a flow chart of a method for publishing content to multiple target sites in parallel.

DETAILED DESCRIPTION

Figure 1:
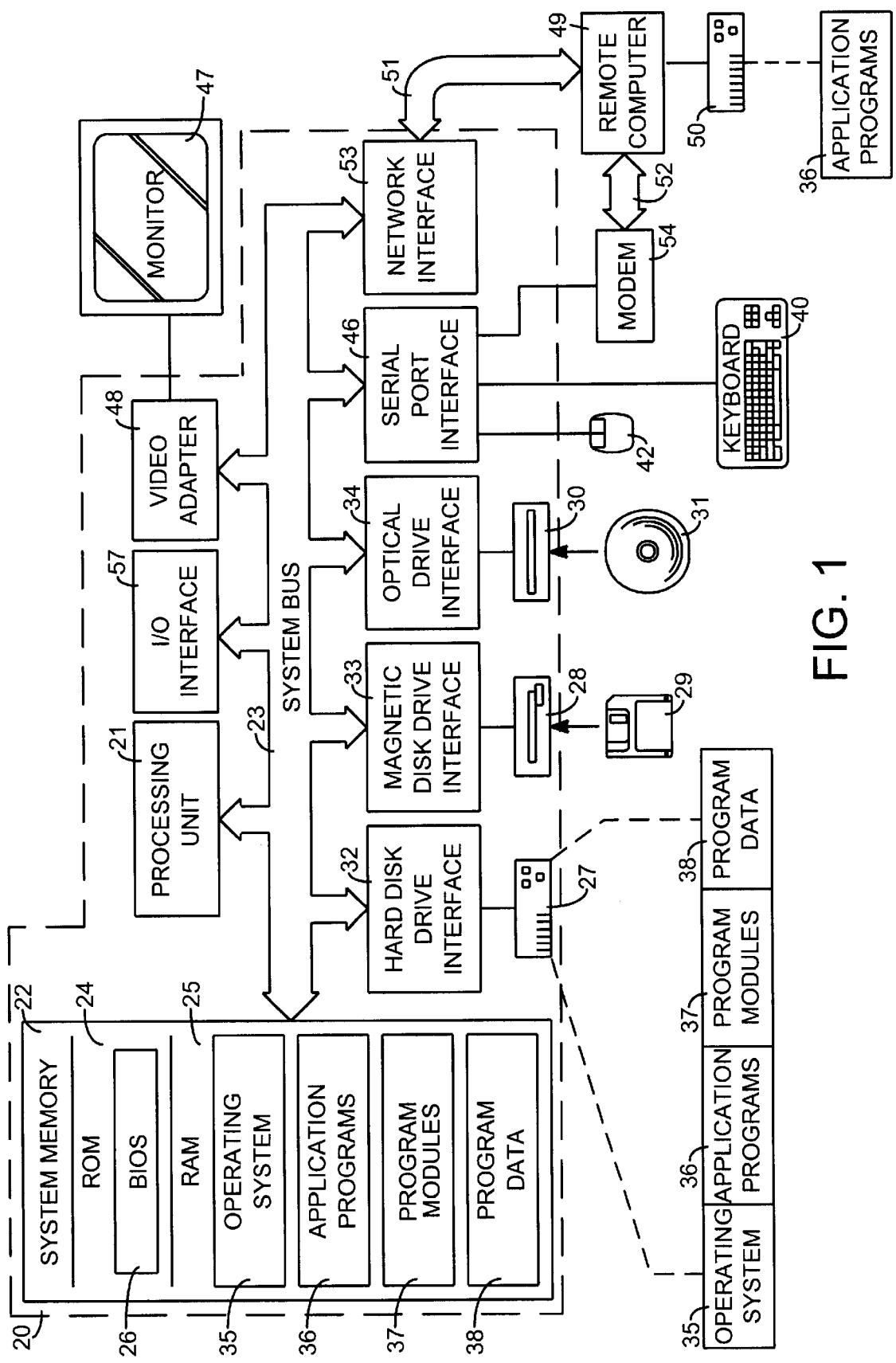
FIG. 1 is a block diagram of a computer system that may be used to implement a method and apparatus according to the invention for republishing content to multiple target sites.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, CDs, DVDs, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42 (such as a mouse). An 1/0 interface 57 is connected to the system bus 23, thereby allowing input data to be routed to and stored in the RAM 25, or one of the other data storage devices associated with the computer 20. The data can be input into the computer 20 from any of the aforementioned computer-readable media, as well as other input devices (not shown) which may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. The remote computer 49 may be a computer, a server, a router, a network PC, a peer device or other common network node, and typically includes many or all of the elements described above relative to the computer 20. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. The computer 20 may be used as a server computer or client computer for implementing the invention described below.

Figure 2:
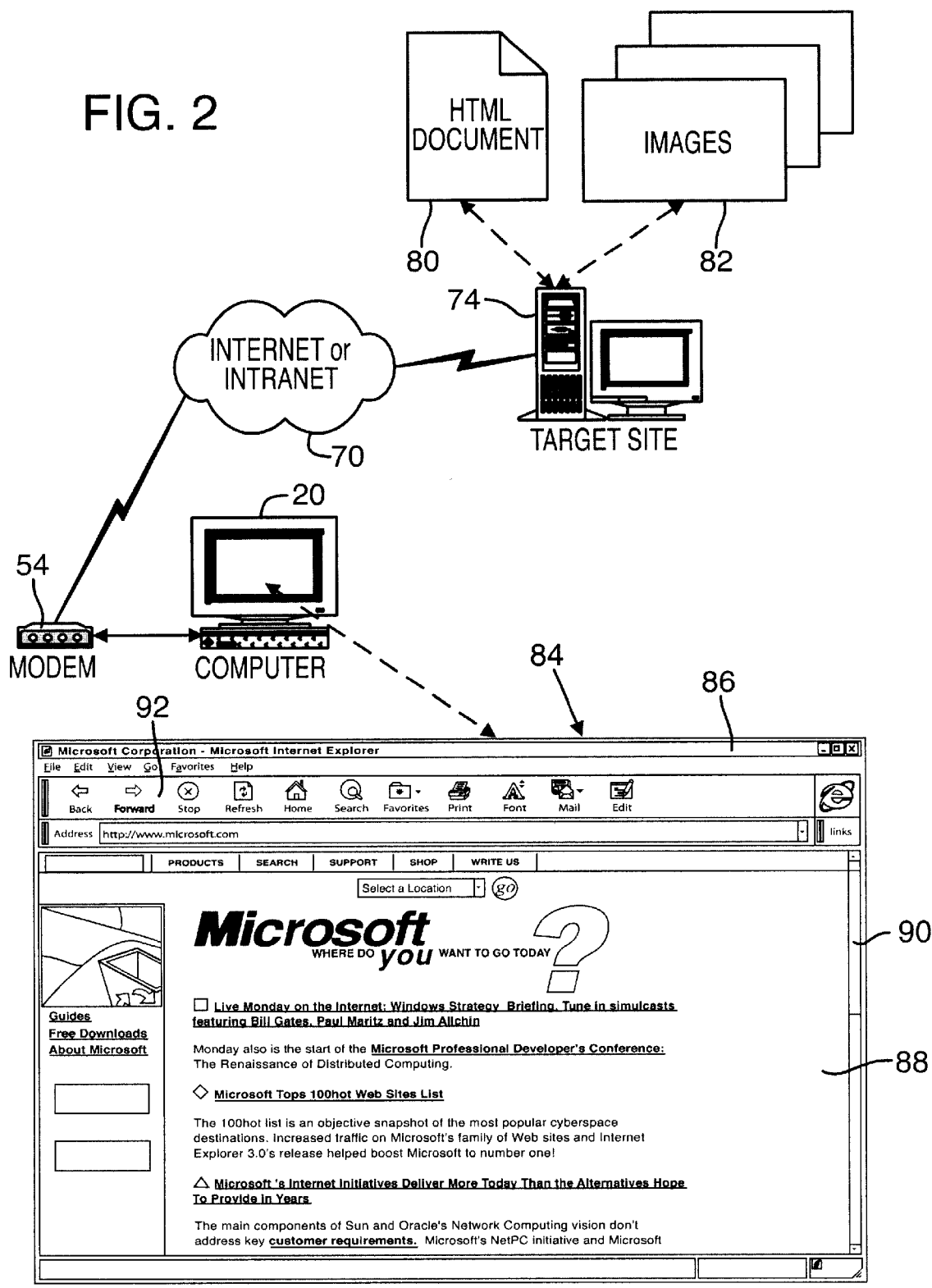
FIG. 2 is a diagram of a browser environment according to an illustrated embodiment.

FIG. 2 shows one application for the computer 20 of FIG. 1. Specifically, the computer 20 is connected the Internet or Intranet, shown generically at 70, using the modem 54. A user typically uses a "browser" (e.g., Microsoft Corporation's Internet Explorer) to access documents and programs available on a remote computer called a server computer 74. In this context, the computer 20 is called a client computer. Typically, documents residing at the server computer 74 are HTML documents, such as document 80, and may include extensions and enhancements of HTML standards. The document 80 is used to display content on the client computer, which may include text, images, audio, video, executable software components, etc. The content may be within the HTML document itself or incorporated therein by using HTML tags that specify the location of files 82 containing content.

An exemplary browser interface 84 displays a document in a window 86 of the computer's display allocated to the browser by the operating system. The illustrated window 86 includes a document display area 88 and user interface controls 90. The browser displays the document within the document display area 88 of the window 84. A browser toolbar 92 is familiar to Internet users and includes a back button, forward button, stop button, etc. As described further below, the server computer 74 is a target site that is supplied content from another server computer called a source site. Eventually, end users view the content using browsers, such as browser 84.

Figure 3:
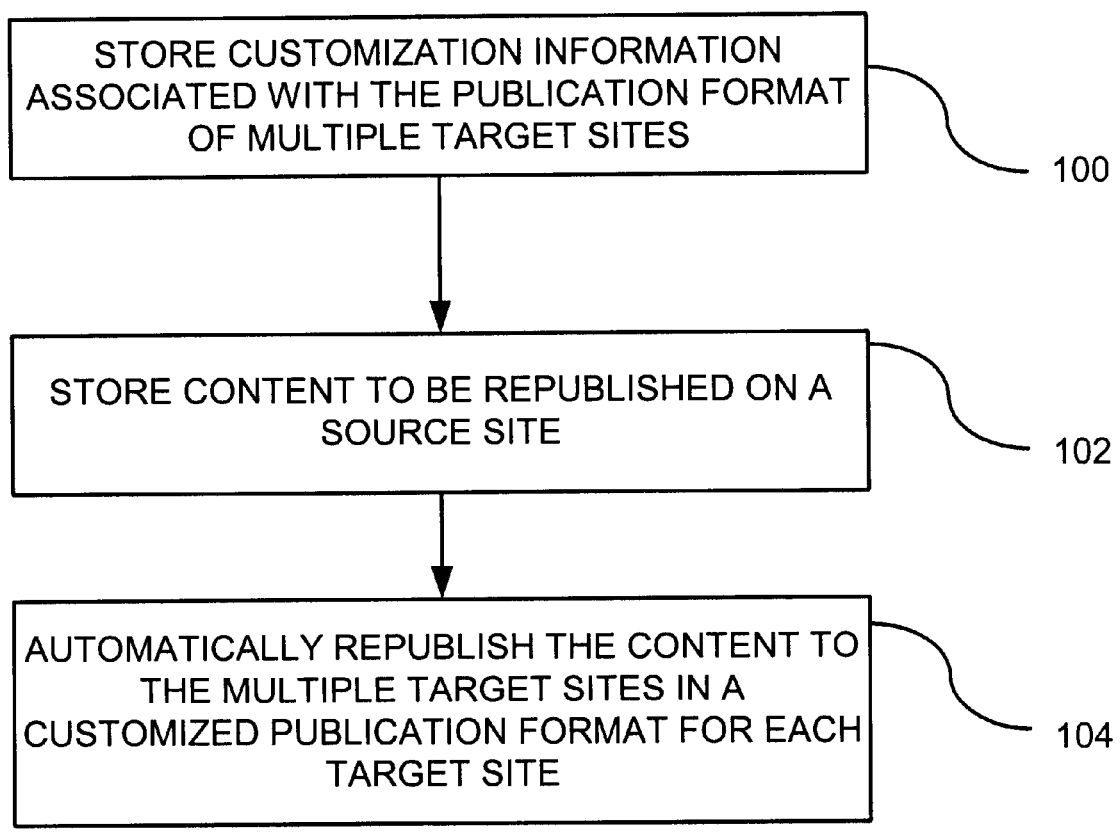
FIG. 3 is a flow chart of a method for automatically republishing content to multiple target sites in a customized publication format for each target site.

FIG. 3 shows a flow chart of a method for republishing content to multiple target server computers. In act 100, customization information associated with the publication format of multiple target sites is stored on a source site. The publication format of the target sites may include the site hierarchy, such as sections and sub-sections, as well as the layouts of the stories within the hierarchy. In act 102, the source site stores content that is to be republished to the multiple target sites. As described further below, this content is typically supplied from journalists working on client computers at locations remote to the source site. In act 104, the source site automatically republishes the content to the multiple target sites in a customized publication format for each target site. This act is accomplished by reading the stored content on the source site and using the customization information that is also stored on the source site to determine the layouts of the stories (the arrangement of words and images, etc.) and where the stories are located in the site hierarchy.

Figure 4:
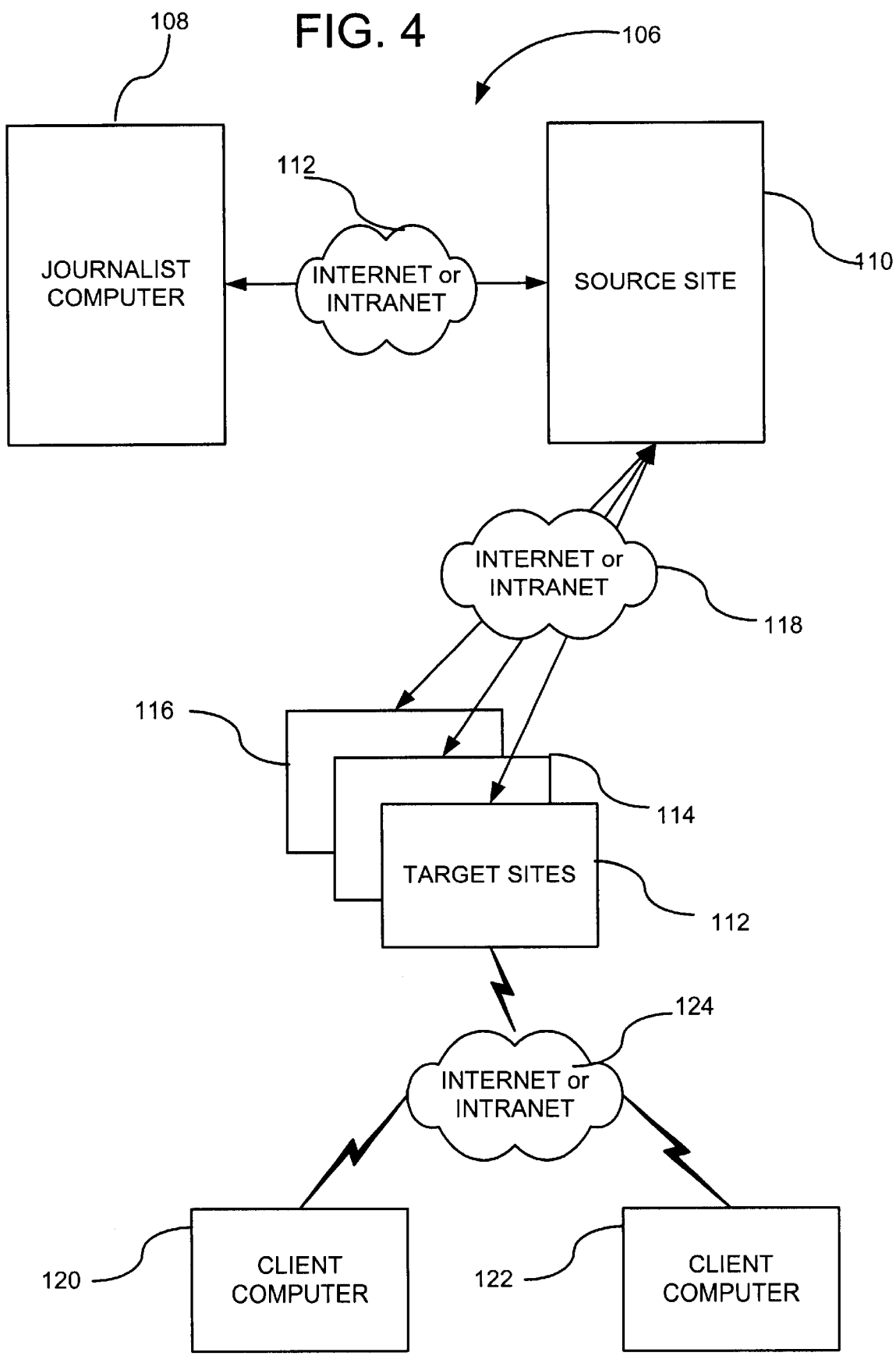
FIG. 4 is a block diagram of an illustrated system for receiving stories from journalists, customizing such stories on a source site, and publishing the customized stories to target server computers for distribution on a network, such as the Internet.

FIG. 4 is an illustration of a system 106 for republishing content to multiple target sites. The system 106 includes one or more journalist computers 108 connected to a source server computer 1 10 through a network 112, such as the Internet. The journalist computer 108 is a client computer that a journalist (or other writer) creates stories on for publication on the Internet. When the journalist completes the story, he or she uploads the story to the source server computer 110 and provides a message indicating that a republish operation should proceed. As described further below, the source server computer 110 republishes the story in a customized format for each target server computer, 112, 114 and 116. The target server computers access the customized story from the source server computer 110 through a network 118, such as the Internet. Examples of the target server computers include ZDNet, MSN and MSNBC. These target server computers provide content displayed to other client computers on the Internet. Thus, client computers 120 and 122 can view the content on the target sites by downloading such content through a network 124. Although only a single journalist computer, two client computers and three target sites are shown, those skilled in the art will recognize that any number of computers may be used.

Figure 11A:
FIG. 11A is an example diagram showing customized section hierarchies for a first exemplary target site.
Figure 11B:
FIG. 11B is an example diagram showing customized section hierarchies for a second exemplary target site.

Turning briefly to FIGS. 11A and 11B, portions of section hierarchies for two separate target computers are shown. Typically the hierarchies of the sections within the targets differ. For example, target 1 shown in FIG. 11A has three sections including "news", "sports" and "business", whereas target 2 shown in FIG. 11B only has sections "news" and "sports." Additionally, the sub-sections under these sections may differ. For example, target 1 includes a "politics" sub-section under "news" whereas target 2 does not. The number of stories within sections or sub-sections may also vary between target sites. For example, target 1 has three stories including story 1, story 2 and story 3 under "international news" whereas target 2 only has two stories including story 2 and story 4. The browse order of the stories, which means the order that the stories are presented to the user within a menu, may also differ between target sites. For example, target 1 has story 2 as the second story under "international news" whereas target 2 places story 2 as the first story under "international news."

FIGS. 5 and 6 are examples of content displayed on different target sites 112 and 114. The content is the same story in both figures, but is customized for each target computer so that the story has a different story layout (i.e., a different arrangement of words and images). The content of both FIGS. 5 and 6 has its origins from the same journalist client computer 108, but is republished by the source site 110 (FIG. 4) in a customized story layout for each target site. FIG. 5 shows an exemplary page of content provided from target server computer 112, which is typically displayed in a browser 84 (FIG. 2) of client computer 120. A menu or list of sections 130 is displayed on the upper left-hand side of the page with the sections aligned vertically. A header 132 is located at the top-most portion of the page above a picture 134 associated with the story. A picture description 136 is also positioned below the picture 134. Finally, a story 138 is shown at the bottom of the page.

FIG. 6 shows a drastically different story layout for the same story. First, a list of sections 140 is shown horizontally across the page, unlike the vertical list of sections 130 of FIG. 5. Additionally, the number of sections within the list 140 and the section names also differ from the list 130 of FIG. 5. The title 132 is the same title as that of FIG. 5, but a sub-title called a deck 142 is added below the title 132. Additionally, the picture 134 displayed in FIG. 5 is absent from the page shown in FIG. 6. Finally, the story 144 in FIG. 6 has a different font and margins than the same text 138 in FIG. 5. Thus, it can be seen that different target computers customize content by providing different layouts of the same story. Such customization is performed by source site 110.

Figure 7:
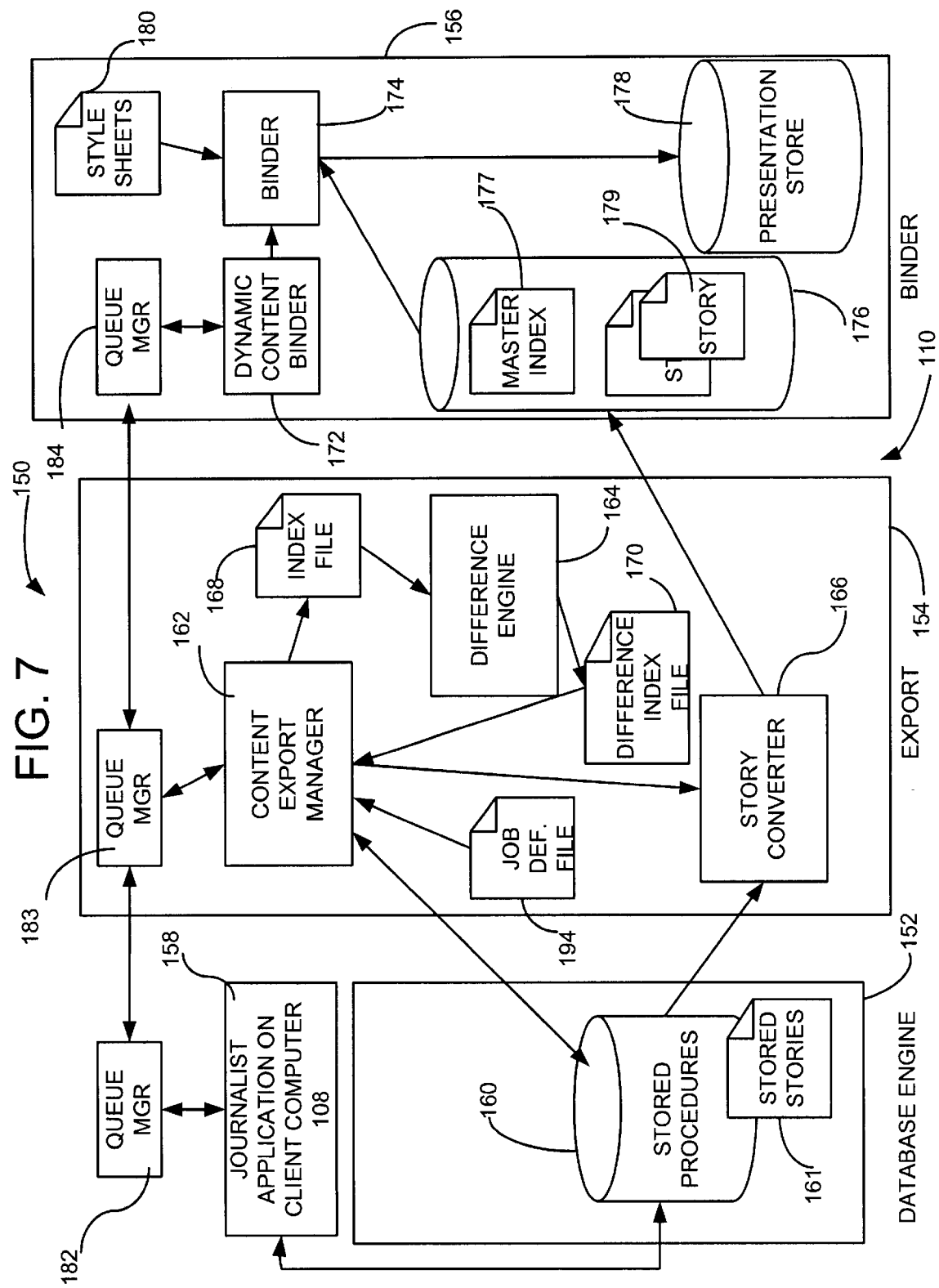
FIG. 7 is a detailed block diagram of the source site of FIG. 4, including a database engine, a content export manager, a difference engine, and a binder.

FIG. 7 shows a detailed block diagram of a system 150 for republishing content to multiple target computers in different formats. The system 150 is located on the source site 110 (FIG. 4) and includes three different server computers 152, 154 and 156. A journalist application 158 (which is not part of system 150) runs on the journalist computer 108 (FIG. 4) and allows a journalist to create content for publication. A typical journalist application is WorkBench created by Microsoft Corporation. The server computer 152 includes a database engine, such as a SQL database engine. The database engine includes stored procedures 160 and content storage 161. As described further below, the stored procedures 160 are invoked by the export server computer 154 to customize content to the target computers. The content storage 161 includes content, such as stories written by the journalist on the journalist computer 108. When the journalist is finished with a story, he or she can upload the story into the content storage for republication. Depending on the journalist application 158, the content type stored in storage 161 varies. For example, where the journalist application is WorkBench, the content is stored in a rich text format (RTF) file type.

Server computer 154 is an export computer and includes a content export manager 162 that controls the overall job process of republication to multiple target sites. The content export manager 162 and the stored procedures 160 together form an index generator for creating an index file. The export server computer 154 also includes a difference engine 164 and a story converter 166. As described further below, the content export manager 162 outputs the index file 168 that indicates stories to be republished on the target sites. However, not all of the stories in the index file are republished since some stories identified in the index file 168 are often identical to stories already published on the target site. As described further below, the difference engine 164 analyzes content currently published on the target site and content identified in the index file 168. The difference engine then generates a difference index file 170 representing the difference between the actual content on the target site and the index file 168. This difference index file identifies the stories that are to be republished to the target site. The story converter 166 converts stories identified in the difference index file 170 from a first format to a second format necessary for publication. For example, in the illustrated embodiment, content is stored in the content storage 161 in an RTF file type and the story converter converts these stories to an XML file type for republication.

The binder computer 156 includes a dynamic content binder 172, a binder 174, a content store 176, and a presentation store 178. The dynamic content binder 172 and the binder 174 together customize the story layout of the stories stored in the content store 176 by applying customization information stored in style sheets 180. There may be more than one style sheet per target computer. For example, one style sheet can be used for stories and one to provide the "fronts" or list of sections available on the target. The style sheets are stored in XSL format and contain any desired customization options the target sites desire. For example, the XSL style sheets can dictate margins, whether or not a picture or deck is included in the story, fonts, colors, etc. For further details on XML and XSL, see http://www.w3.org/XML and http://www.w3.org/Style/XSL. The content store 176 includes a master index file 177 and stories 179 in XML format. As further described below, the binder computer may also dynamically build linking information to be inserted in the formatted stories. This linking information allows a client user to select other stories available on the target computer.

Queue managers 182, 183, 184 allow for communication between the journalist client computer 108 and server computers 154, 156. As described further below, the queue managers allow for multiple republishing jobs to be carried out simultaneously. For example, the content export manager 162 may be multi-threaded to carry out multiple republishing jobs simultaneously or the export computer 154 may contain multiple processors performing parallel processing to carry out multiple publishing jobs simultaneously.

Figure 8:
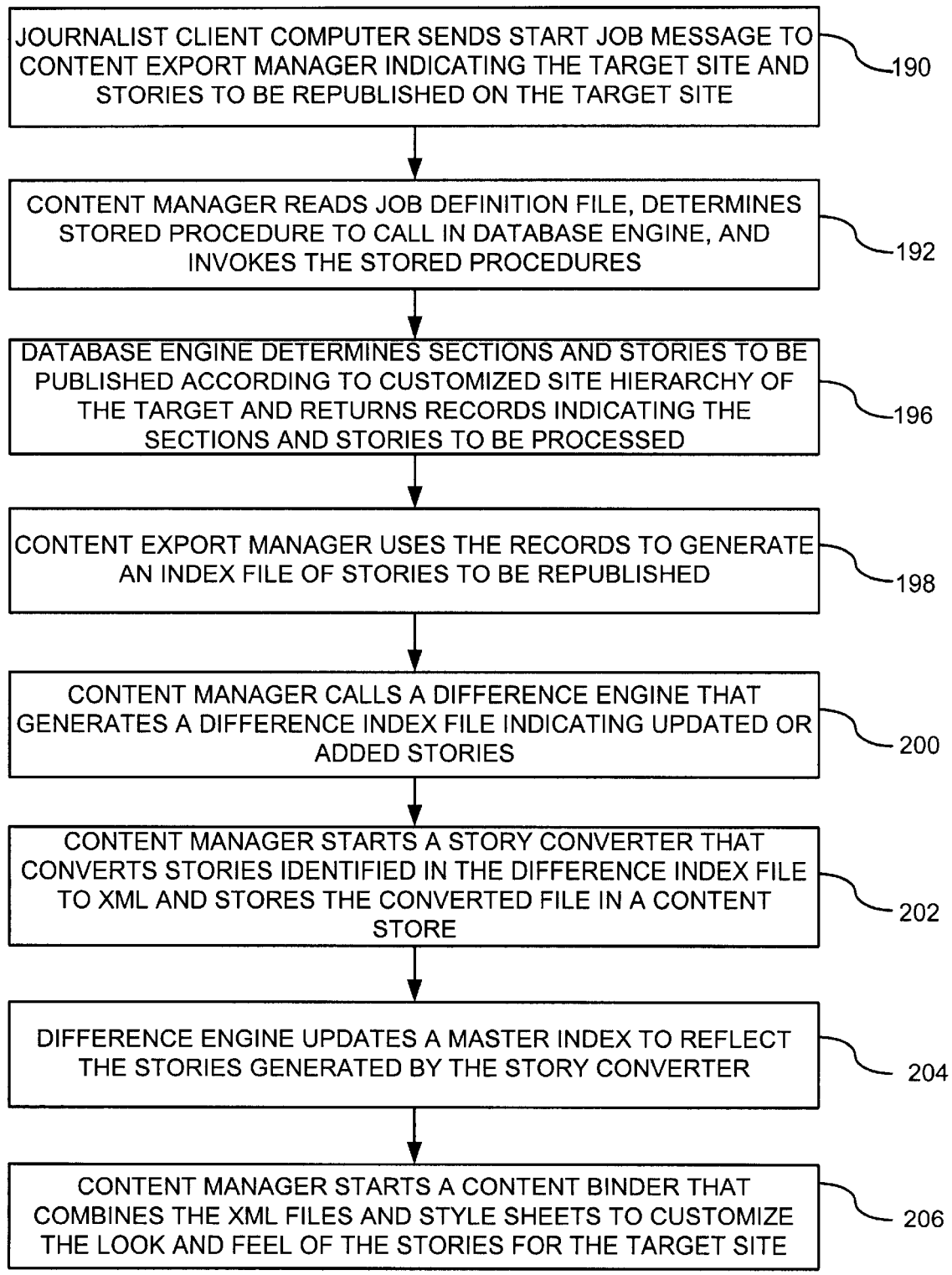
FIG. 8 is a detailed flowchart of a method for republishing content in a customized format to multiple target server computers using the source site of FIG. 7.

FIG. 8 shows a method for republishing content to multiple target sites and is discussed in conjunction with the system 150 of FIG. 7. The republishing process starts with a message from the journalist client computer 108. The journalist client computer stores a new story in the content storage 161 of server computer 152. The journalist computer then sends a "StartJob" message to the content export message manager 162 through queue managers 182, 183 (act 190). The StartJob message has the following format:

| | StartJob |
|---|---|
| Method: | HRESULT StartJob(long lJobId, DATE budgetDate, BSTR strEdition, BSTR strSectionID, long IPieceID); |
| Purpose: | This method sends the message to the destination queue opened with "Initialize" method. |
| Input Parm: | lJobId - A combination of request, object types, and target sites. |
| | budgetDate - Budget date |
| | strEdition - Edition |
| | strSectionID - section ID |
| | IPieceID - piece ID |
| Output Parm: | None |
| Return: | HRESULT |

Many of the parameters identified in the "StartJob" message are particular to the implementation of the illustrated embodiment and may or may not be used in other implementations. The parameter "lJobID" identifies the target sites that the "StartJob" message is associated with (i.e., the target sites that the content export manager 162 republishes to). Other parameters, such as "budgetDate," "strSectionID" and "1PieceID" are used to identify stories within the storage 161 that are to be republished.

In act 192, the content export manager 162 reads a job definition file 194 that contains information used by the content export manager to know how to handle the startjob message. A sample job definition file is as follows:

```
<?xml version="1.0" standalone="yes" ?>
<JobDef>
    <GlobalInfo>
        <PreScript Path=" " />
        <PostScript Path=" " />
```

```
        <ObjTypes>
            <ObjType Name="Budget" Mask="16777216" />
            <ObjType Name="Section" Mask="33554432" />
            <ObjType Name="Piece" Mask="67108864" />
        </ObjTypes>
        <Request Types>
            <Request Name="Release" Mask="268435456" />
            <Request Name="Preview" Mask="536870912" />
        </RequestTypes>
            <ExportPath Path = "\\toolsville\Sites\MSN\Export\" />
</GlobalInfo>
<SiteInfo>
<Site Name="MSN" Mask="1"
        DirLevel="1"
        ContentStorePath="\\toolsville\sites\MSN\ContentStore\"
        BinderPreviewPath="\\toolsville\sites\MSN\Preview\"
        BinderReleasePath="\\toolsville\sites\MSN\Release\"
        BrowserPreviewPath="http://3.4.4.123/sites/MSN/Preview/"
        BrowserReleasePath="http://3.4.4.123/sites/MSN/Release/"
        StyleSheetPath="\\toolsville\sites\MSN\Stylesheets\"
        FileType="xml"
        BudgetDate="08/07/97"
        Edition="H"
        BinderOutput=".htm" BinderInput=".xml"
        NoMediaCopy="True">
            <BLinks StoryLevel="0" LinkLevel="0" XSL="BColumnLinks.xsl" OutputType="inc"/>
            <BLinks StoryLevel="1" LinkLevel="1" XSL="BColumnLinks.xsl" OutputType="inc"/>
            <BLinks StoryLevel="ALL" LinkLevel="1" XSL="BColumnLinks.xsl" OutputType="inc"/>
            <Component XML="this" XSL="mmccdf.xsl" OUTPUT="mmc.cdf" />
            <DataSource Name="ApolloTest1;UID=BorgService;PWD=Assimilate"/>
            <Encoding>encoding="Windows-1250"</Encoding>
            <Query Name="sp_XML_GetMMCIndexFile">
                <Argument Name="BudgetDate" Type="VT_DATE" />
                <Argument Name="Edition" Type="VT_CHAR" />
                <Argument Name="SectionList" Type="VT_BSTR" />
                <Argument Name="PieceID" Type="VT_I4" />
            </Query>
</Site>
</SiteInfo>
</JobDef>
```

The job definition file contains a query name associated with each target site. For example, if the StartJob message indicates the target site is MSN, the content export manager 162 extracts a query name associated with MSN from the job definition file and invokes stored procedures 160 within database engine 152 using the query name. The job definition file generally stores the characteristics of the target site including where to write the republished files. In act 196, the database engine determines sections and stories to be published according to the customized site hierarchy of the target site, as is further described below. The database engine 152 then returns records indicating the sections and stories to be processed. Exemplary records areas follows:

TempXMLChannel
TempXMLChannel defines the set of channels (or sections, the terms are used interchangeably here) that match the job request. Fields are defined in terms of their equivalents in the Workbench database.

| Field name | SQL data type | Comment |
| --- | --- | --- |
| SectionID | Varchar(20) | Internal ID for this section. |
| Parent | Varchar(20) | Parent section for this section. For top-level sections, this can be Null, or it can be the same as SectionID |
| Channel Name | Varchar(100) | Human-readable name for the section. |
| HasFront | Tinyint | Defines whether a channel front should be built for this section. |

TempXMLStory
TempXMLStory defines the set of stories that match the job request. Fields are defined in terms of their equivalents in the Workbench database.

| Field name | SQL data type | Comment |
| --- | --- | --- |
| PieceID | Int | Internal ID for story |
| BrowseOrder | Smallint | The order of the story in the section. These values are not necessarily unique or sequential within a section |
| SectionID | Varchar(20) | ID of the section containing this story. |
| Timestamp | Datetime | Date and time of last modification. |
| Address | Varchar(255) | For stories that are not buildable by MCAS, this is a URL to the page associated with this index file entry. Otherwise it is Null. |
| Headline | Varchar(255) | Headline for the story. May be Null. |
| Deck | Varchar(255) | Deck for the story. May be Null. |
| Abstract | Text | Abstract for the story. May be Null. |
| OriginalPieceID | Int | This number forms the base of filename for the page generated by MCAS. As stories are revised, the PieceID will change, but the OriginalPieceID will remain the same, so that links to that story remain valid. |
| PieceType | Int | 0 indicates a normal story, 1 indicates a story which was originally a link to |

-continued

TempXMLStory
TempXMLStory defines the set of stories that match the job request.
Fields are defined in terms of their equivalents in the Workbench database.

| Field name | SQL data type | Comment |
|---|---|---|
|  |  | another page. This is mainly internal information. |
| NoBuild | Int | Indicates pieces which MCAS should not attempt to bind with a style sheet. |

The record entitled "Temp XML Story" is shown for only a single story.

Typically, a similar record is created for each story that is to be republished so that the record set identifies all of the stories to be republished. Additionally, the field SectionID indicates the section of the target site's hierarchy that the story is be stored in. The record also indicates a browse order for the story and a headline, deck, and abstract for the story. Depending on the particular implementation, many of these fields may be omitted. Alternatively, additional fields may be added as needed.

In act 198, the content export manager 162 uses the records to generate an index file of stories to be republished. An example index file is as follows:

and the desired browse order for the stories. However, all of the stories in this index file do not necessarily need to be republished, since many may have already been published on the target site. Consequently, the content export manager 162 calls the difference engine 164 that generates the difference index file 170 (act 200). The difference engine reads the master index file 177 located in the content store 176 and compares the master index file to index file 168. The difference engine then determines the sections and stories in the index file 168 that are new, deleted, or added. In other words, the difference engine determines the difference between the master index file and the index file. The stories identified by the difference engine are stored in the difference index file 170 and are used for republishing content to the target sites. After the difference engine generates the difference index file 170, the content export manager 162 starts the story converter 166 that converts stories identified in the difference index file to an XML file type and stores the converted files in the content store 176 (act 202). In act 204, the difference engine updates the master index within content store 176 to reflect the stories generated by the story converter 166. In act 206, the content export manager 162 starts the binding process. During the binding process the dynamic content binder 172 and the binder 174 extract the XML stories from the content store 176 and apply style sheets 180 to the XML files. The style sheets contain customization information in XSL format and dictate the particular story layout for each story. For example, the style

```
<?xml version="1.0" encoding="Windows-1250"?>
<MSNBCIndex BudgetDate="08/07/97" Edition="H" ObjType="Section" Preview="No"
                JobSection="INTLNEWS">
    <Site Name="Jong" Mask="1" DirLevel="1"
            ContentStorePath="\\toolsville\sites\msn\users\jong\ContentStore\"
            BinderPreviewPath="\\toolsville\sites\msn\users\jong\Preview\"
            BinderReleasePath="\\toolsville\sites\msn\users\jong\Release\"
            BrowserPreviewPath="http://3.4.4.123/sites/msn/users/jong/Preview/"
            BrowserReleasePath="http://3.4.4.123/sites/msn/users/jong/Release/"
            StyleSheetPath="\\toolsville\sites\msn\Stylesheets\"FileType="xml"
            BudgetDate="08/07/97" Edition="H" BinderOutput=".asp" BinderInput=".xml"
            NoMediaCopy="True" ExportFileNameKey="PieceID">
        <BLinks StoryLevel="0" LinkLevel="0" XSL="BColumnLinks.xsl" OutputType="inc"/>
        <BLinks StoryLevel="1" LinkLevel="1" XSL="BColumnLinks.xsl" OutputType="inc"/>
        <BLinks StoryLevel="ALL" LinkLevel="1" XSL="BColumnLinks.xsl" OutputType="inc"/>
        <DataSource Name="ApolloTest1;UID=BorgService;PWD=Assimilate"/>
        <Encoding>encoding="Windows-1250"</Encoding>
        <Query Name="sp_XML_GetMSNIndexFile">
            <Argument Name="BudgetDate" Type="VT_DATE"/>
            <Argument Name="Edition" Type="VT_CHAR"/>
            <Argument Name="SectionList" Type="VT_BSTR"/>
            <Argument Name="PieceID" Type="VT_I4"/>
        </Query>
    </Site>
    <Channel Name="MSN News Channel" ChannelFileName="NEWS" Status="131072">
        <ChannelName="International News" ChannelFileName="INTNEWS">
            <Story PieceID="209409" OriginalPieceID="209409" BrowseOrder="1" PieceType="0"
                    TimeStamp="1998.12.11:12:15:55" Status="0">
                <HeadLine>What White House sex scandal?</HeadLine>
                <Deck>Elections appear to be largely untouched by Lewinsky case</Deck>
                <Abstract>For months the expectation was that the Monica Lewinsky scandal would create Terrible
                Tuesday for Democrats on Election Day. Now it appears the Lewinsky factor may have vanished.
                </Abstract>
                <Link/>
                <Art>\\toolsville\sites\msn\users\jong\ContentStore\215723.jpg</Art>
            </Story>
        <Channel>
    </Channel>
</MSNBCIndex>
```

This index file identifies each story that the StartJob message indicated should be republished on the target site sheets may used to include or exclude a picture, deck, header, etc. The binder 174 then stores the customized stories in a presentation store 178 in HTML or ASP file types. Other file types also may be used. The target sites 112, 114, 116, etc. (FIG. 4) may then access the presentation store and download the stories for presentation on their respective sites.

Figure 14:
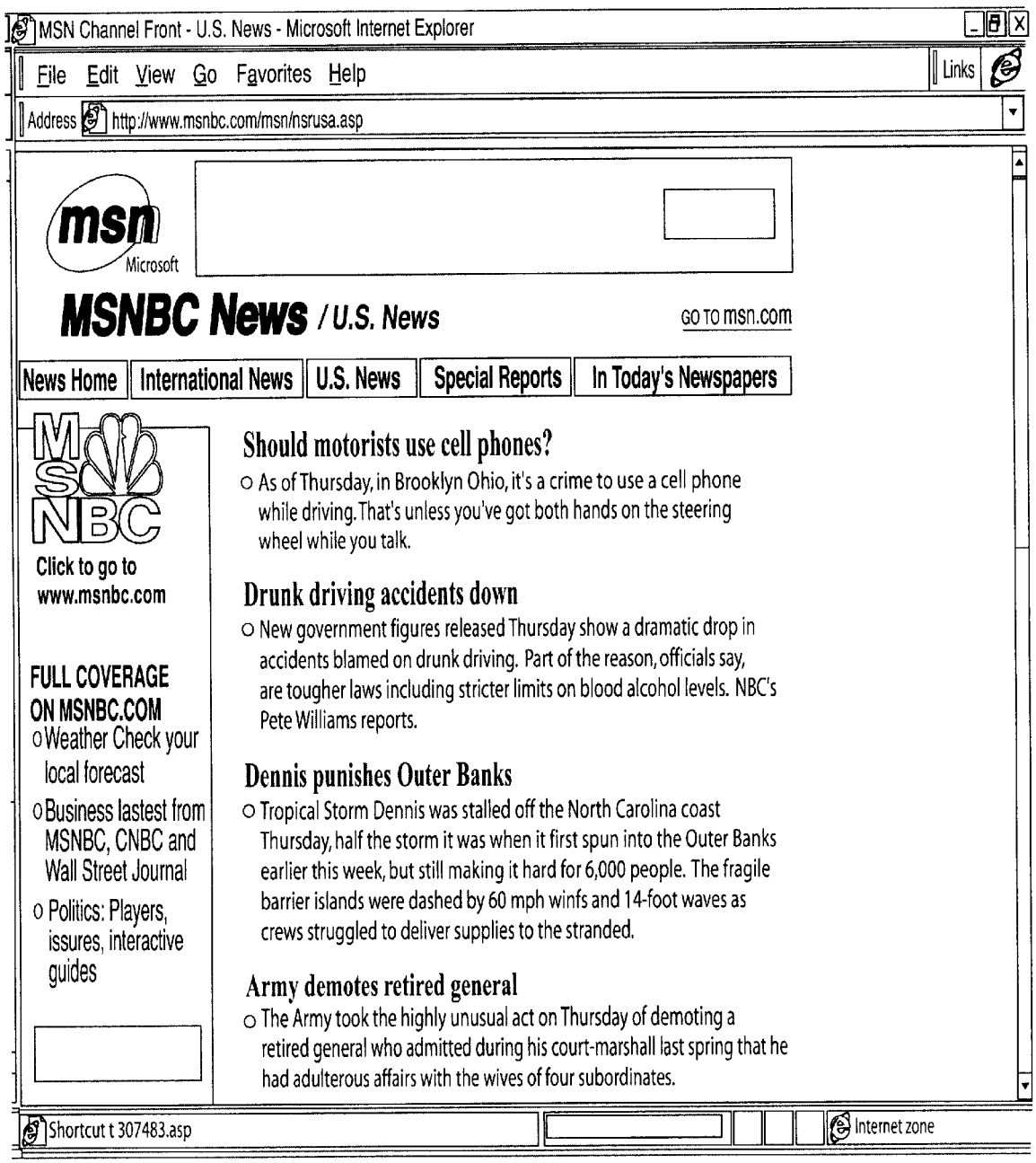
FIG. 14 is an illustration of content containing a list of stories derived from a master index file.
Figure 15:
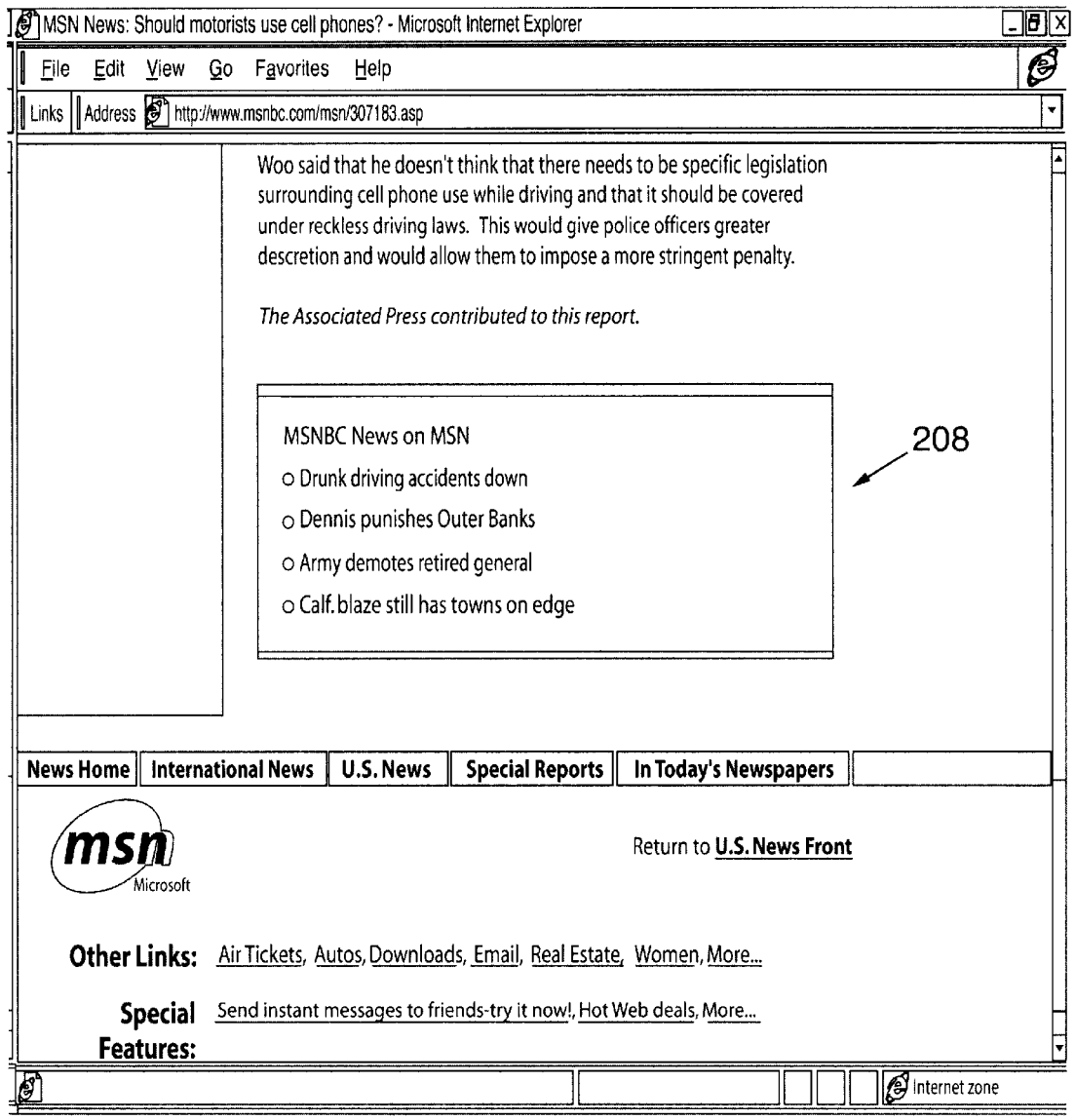
FIG. 15 is an illustration of a page showing cross-linking information derived from the master index file.

The binding process may make use of the hierarchical information stored in the master index file for the target site to dynamically build linking information into the formatted stories. In addition, the binding process may refer to the master index file in order to generate unique index pages (table of contents) which provide related groupings of stories (and optional description thereof), and/or other structure-derived site content components. For example, FIG. 14 shows an illustration of a page having a list or grouping of related stories available on a target site. This list is derived from the master index file. FIG. 15 also shows a list 208 shown at the bottom of a story. This list provides cross-linking information to other stories available on the target site and also is derived from the master index file.

Figure 9:
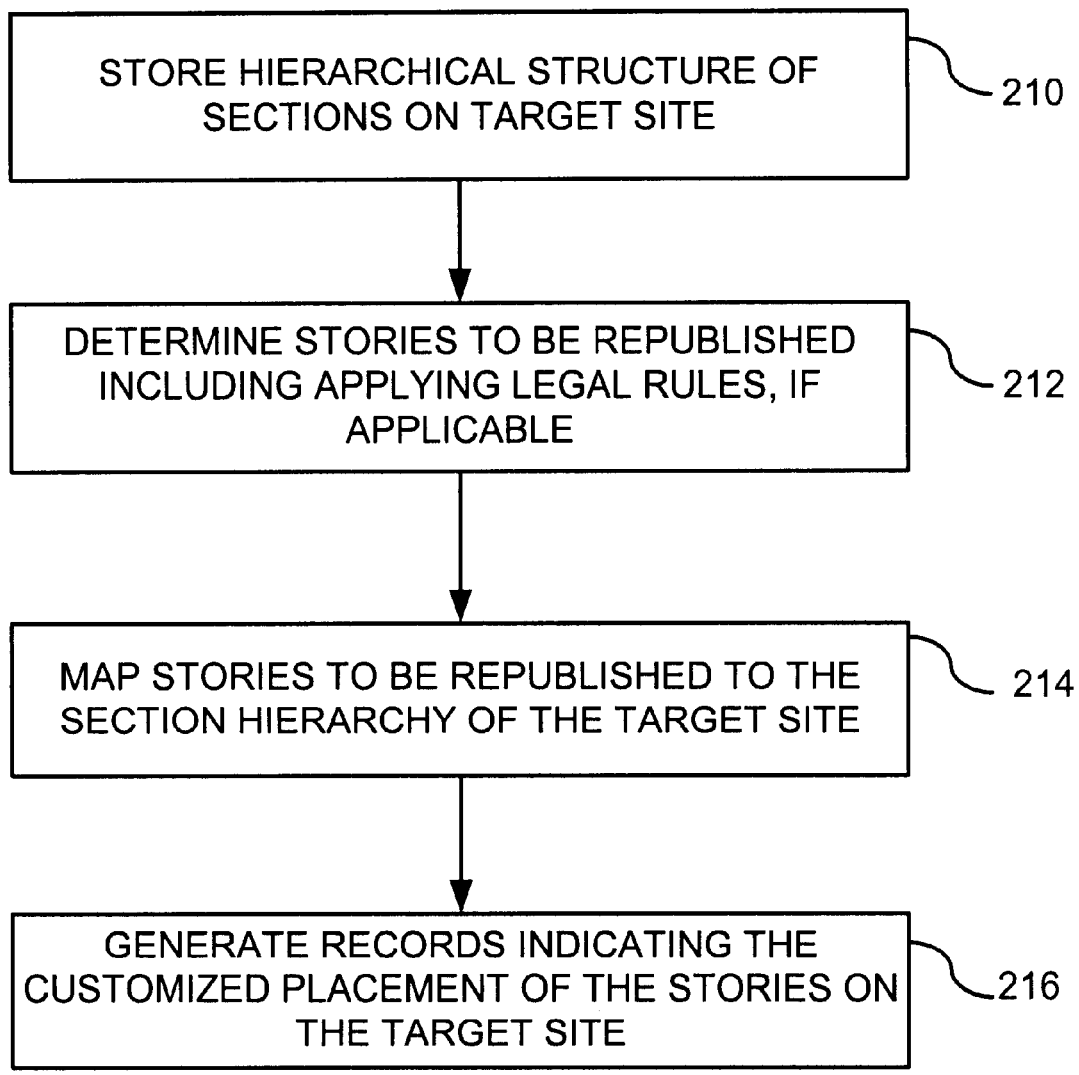
FIG. 9 is a flow chart of a method used by the database engine of FIG. 7 for mapping stories to a customized section hierarchy of a target site.

FIG. 9 shows a method used by the database engine 152 for extracting stories that are to be republished. In act 210, the hierarchical structure of sections on the target site is stored in the storage 161 (FIG. 7). An example of a hierarchical structure of a target site is shown in FIG. 11A and includes sections, such as news, sports, business, and sub-sections, such as international news. Although new not shown, the target site may also have sub-sub-sections, sub-sub-sub-sections, etc. In act 212, the database engine determines the stories to be republished including applying legal rules, if necessary. The determination of stories to be republished starts with the appropriate query invoked by the content export manager 162 as already described. The query includes parameters, such as a section ID or a story ID that identify the stories that need to be republished. The database engine then uses internal tables (described below) to determine the number of stories desired for the given section and the browse order of the stories for the section. The number of stories per section and browser order are customization features that vary between target sites. The database engine may also ensure that stories are not included in the record set that violate predetermined legal rules. For example, if the target site does not have a contract for displaying content from the Wall Street Journal then any stories published by the Wall Street Journal are automatically excluded from the resulting record set. In such a case, if the internal tables indicate two stories are needed for a section, the database engine ensures that those stories are not stories from the Wall Street Journal. A table entry in the database engine may have a number of fields such as (1) an original section ID, (2) a new section ID, (3) the desired browse order, and (4) a number of stories for each section. The original section ID is the identification of the section on the source site. The new section ID is the corresponding section identification on the target site. The browse order is the order that this story is supposed to be stored within a section. And the number of stories of each section defines how many stories are displayed for a section on the target computer.

In act 214, the database engine space 152 maps each story to be republished to a section hierarchy on the target site. Thus, using the table entries described above for each story, a section ID is identified on the target computer for that story and the browse order for that story. This mapping is recorded in the record tables that are returned to the content export manager 162. In act 216, the database engine generates the records used to create the index file 168. The records indicate the customized placement of the stories in the target site hierarchy including the sections where the stories are to be stored.

Figure 10:
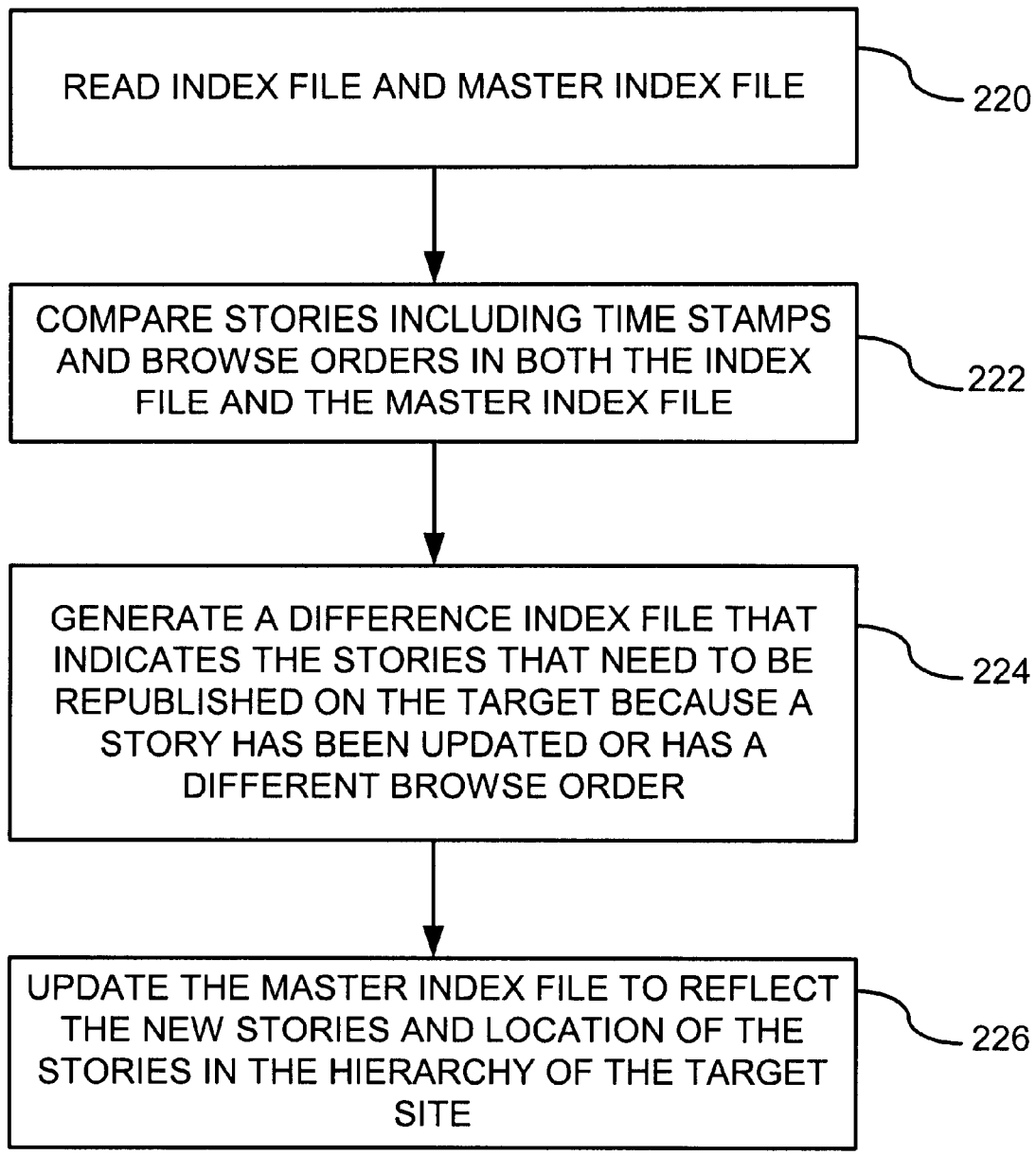
FIG. 10 is a flow chart of a method used by the difference engine of FIG. 7.
Figure 12A:
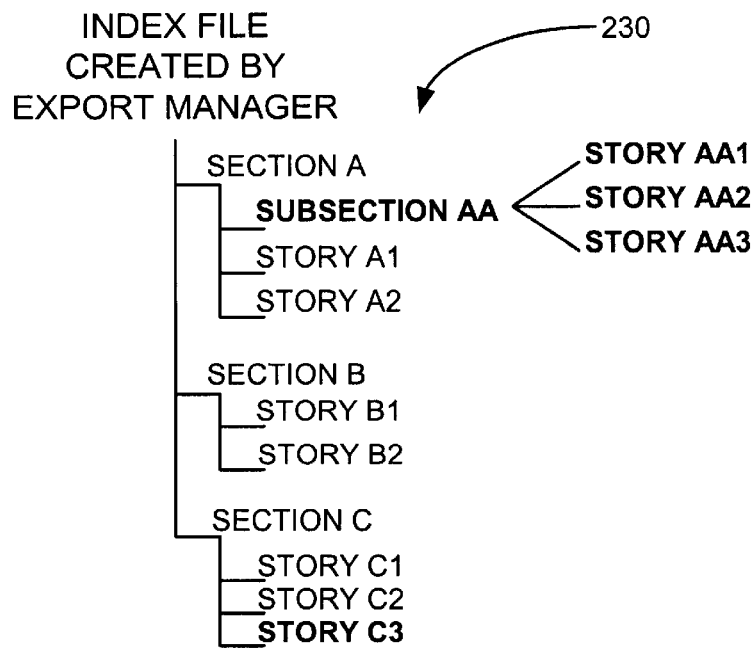
FIG. 12A is an illustration of an exemplary index file, used by the difference engine of FIG. 7.
Figure 12B:
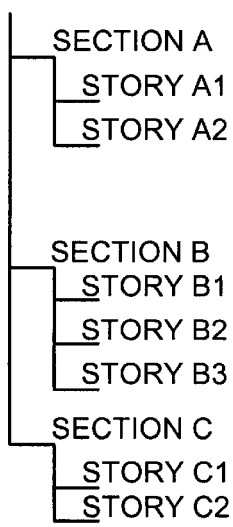
FIG. 12B is an illustration of an exemplary master index file used by the difference engine of FIG. 7.
Figure 12C:
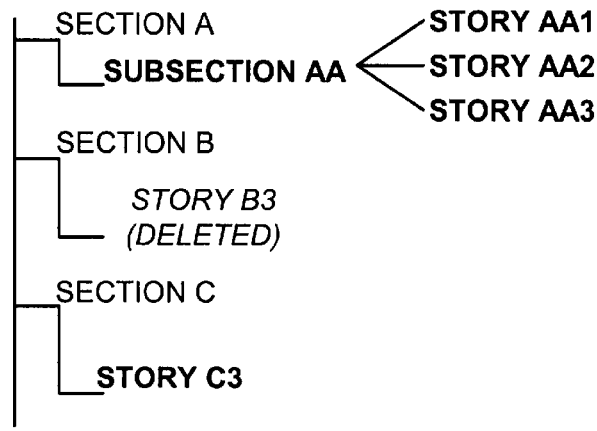
FIG. 12C is an illustration of an exemplary difference index file used by the difference engine of FIG. 7.

FIG. 10 shows a method used by the difference engine 164 for generating the difference index file 170. In act 220, the difference engine 164 reads the index file 168 created by the content export manager 162, and reads the master index file stored in content store 176. Turning briefly to FIG. 12A, an example of sections and stories in an index file is shown at 230. Additionally, in FIG. 12B a master index file 232 is shown and a difference index file 234 created by the difference engine 164 is shown in FIG. 12C. The master index file 232 shows the stories and sections that are currently published on a target computer. The index file 230 shows the desired look of the target site after republication. For simplicity, the sections and stories shown as bolded text in the index file 230 are stories that are to be added to the target site. The unbolded sections are sections that are either unchanged or deleted.

Returning to FIG. 10, in act 222, the difference engine 164 compares stories, sections, subsections, etc. in the index file 168 to the master index file. The comparison includes analyzing the timestamps on stories identified in both files. In act 224, the difference engine 164 creates the difference index file 170 that indicates a difference between the index file and the master index file. Returning briefly to FIG. 12A, it can be seen that the index file 230 has a new subsection (as compared to the master index 232 of FIG. 12B) listed as subsection AA with three stories, AA1, AA2, and AA3, associated with it. Additionally, a new story under section C called "Story C3" has also been added. Finally, the story B3 shown in the master index file 232 has been deleted in the index file 230. The difference index file 234 of FIG. 12C indicates the new subsection AA, the story C3, and that Story B3 has been deleted. The difference index file 234 indicates that only these changes are to be republished, thereby shortening the overall publishing process. Returning to FIG. 10, in act 226, the difference engine 164 updates the master index file in content store 176 to reflect the new stories, sections and subsections and the location of the stories in the hierarchy of the target site. Thus, the master index file again contains the current state of the target site.

Although not shown, a validator periodically runs and compares the master index file 177 to stories stored in presentation store 178. The validator essentially cleans up the presentation store to ensure it matches the master index file 177. Returning to the example of FIG. 12B, the story B3 is deleted from the presentation store by the validator. The validator is a system component and another client of the master index file. A large, dynamically generated site may find that published content size grows without bound unless methods are applied to periodically remove content which is no longer referenced. By correlating published content against the current instance of the master index file, the validator is able to constrain published content store growth in a deterministic manner by removing items which are no longer referenced by the master index file.

FIG. 13 shows a flow chart 240 of a method for publishing multiple jobs in parallel on the source site 110. The parallel publishing can be accomplished by having multiple processors operating in parallel or through well know multi-threading techniques. In order to achieve the parallel processing, queue managers 182, 183, 184 (FIG. 7) are used to queue messages from the journalist computer 108 and messages passed between the content export manager 162 and dynamic content binder 172. In act 250, a first command is received from a journalist computer and is stored in the queue 182. The content export manager 162 receives this command through the queue manager 183 and generates a status table entry associated with the command (act 252). The status table has a number of fields including the following:

1) a job identifier to uniquely identify each job that is occurring in parallel;
2) a story converter field for identifying the status of the story converter 166;
3) a binder field indicating the status of the dynamic content binder 172 and binder 174;
4) a field pointing to the difference index file 170; and
5) a field having a URL of content created by the binder 174. This URL allows the journalist to preview the content created by the binder 174.

Additional fields or alternative fields may be used.

In act 254, a second command from a second journalist computer (not shown) is received from the second journalist computer. In act 256, the content export manager creates a second status table entry for the second command. Finally, in act 258, the content export manager uses the status table entries to carry out both commands in parallel. For example, the content export manager 162 may ask the story converter 166 to start converting stories from a job initiated by one StartJob command. During this time, another job started from another StartJob command may be in the process of having its difference index file created. Although only two stories are described being published in parallel, any desired number of jobs can be published by simply adding status table entries.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

Although the illustrated embodiment is shown primarily using the Internet for communication between the source site, target sites, and various client computers, the invention may be applied to any network connection including the Intranet, a WAN, a LAN, etc.

Additionally, although a specific embodiment for the source site is shown, other designs can be used. For example, the difference engine can be eliminated. Additionally, the source site may have more or less server computers to handle the republication.

Furthermore, although the story converter converts the stories from RTF to XML file types, other file types may be used such as SGML or HTML. When different file types are used, different style sheets corresponding to the formats may also be used. It is anticipated that new forms of markup languages designed for networks will be developed in the future and such new forms can readily be applied to the present invention in place of XML and XSL.

In view of the many possible embodiments to which the principles of our invention may be applied, it should be recognized that the detailed embodiments are illustrative only and should not be taken as limiting the scope of our invention. Rather, we claim all such embodiments as may come within the scope of the following claims and equivalents thereto.

We claim:

1. In a network environment with a source site including at least one server computer coupled to multiple target sites associated with at least one respective server computer, a method of republishing content to the multiple target sites, comprising:

storing format information indicating target-specific publication formats for publishing content on the multiple target sites;

storing content in a first publication format at the source site; and automatically republishing the stored content to the multiple target sites by converting the stored content from the first publication format to multiple target-specific publication formats customized for the respective multiple target sites by using the format information associated with the respective multiple target sites;

wherein a journalist client computer is coupled to the source site and wherein the journalist client computer has a client publishing application running thereon and the republishing occurs upon receiving a publish command from the client publishing application running on the journalist client computer.

2. The method of claim 1 wherein the format information includes a site hierarchy of each target site, the site hierarchy including topic headings and stories associated with the headings.

3. The method of claim 2 including:
   providing a hierarchy of content on the source site; and
   remapping the hierarchy of the content stored on the source site to the hierarchy of the target site.

4. The method of claim 1 wherein the content is a story and the first publication format includes text of the story and an image associated with the news story.

5. The method of claim 4 wherein the publication format on at least one of the target sites includes the text of the story, but without the image associated with the story.

6. The method of claim 1 further including storing legal restrictions associated with content displayed on the target sites.

7. The method of claim 6 further including determining if content to be republished complies with the legal restrictions for a target site, and only republishing the content to the target site if displaying the content complies with the legal restrictions.

8. The method of claim 1 wherein the source site determines content that changed since the source site last republished to a target site and republishing includes only republishing content to the target site that has changed.

9. The method of claim 1 wherein automatically republishing includes converting the stored content to an XML file type.

10. The method of claim 1 wherein automatically republishing includes creating an index file that summarizes content to be displayed on each target site.

11. The method of claim 1 wherein one of the publication formats is to publish content formatted for a hand-held mobile device and another publication format is to publish content formatted for a monitor on a client computer.

12. The method of claim 1 wherein the different publication formats include having a different arrangement of text and images within the content.

13. The method of claim 1 wherein republishing includes converting the content stored on the source site to an XML file type that identifies at least a heading for a story, an abstract for a story, and text for a story to be published on a target site.

14. The method of claim 13, wherein republishing includes reading XSL style sheets and applying the XSL style sheets to the content in XML to generate an output file in a publication format for a target site.

15. An apparatus for storing content on a source site and for republishing the stored content to multiple target sites on a network so that the target sites can display the stored content in a customized format, comprising:

storage on the source site that stores content including stories to be published;

an index generator coupled to the storage, the index generator for creating an index file that identifies at least a portion of a content-based section hierarchy of a target site and stories within the content-based section hierarchy that are to be republished to the multiple target sites; and a journalist client computer having a client publishing application running thereon coupled to the source site, for generating a start message that identifies stories to be republished and that includes a target site identifier identifying a target site that the stories are to be republished on.

16. The apparatus of claim 15 wherein the index generator includes a content export manager coupled to the journalist client computer, the content export manager for receiving the start message from the journalist client computer and for invoking a procedure associated with the target site.

17. The apparatus of claim 15 further including:
(a) a master index file identifying a section hierarchy of the target site and current stories published on the target site;
(b) a difference engine that reads the master index file and the index file created by the index generator and determines which stories have been updated or added to the current stories published on the target site;
(c) wherein the difference engine produces a difference index file that represents the updated or added stories; and
(d) a binder for dynamically building linking information by using the master index and placing the linking information into the stories.

18. The apparatus of claim 15 wherein the index generator includes a database engine having stored procedures thereon corresponding to each target site, the stored procedures for generating a list of stories to be published on the target site.

19. The apparatus of claim 15 further including a story converter that reads the content including the stories stored on the source site and that converts the stories to an XML file type.

20. The apparatus of claim 19 further including a content store that stores a master index and the stories in an XML file type.

21. The apparatus of claim 20 further including a binder that associates a story in an XML file type with an XSL style sheet corresponding with the target site to generate the final published story.

22. The apparatus of claim 15 further including a status table stored on the source site that tracks multiple jobs being republished in parallel.

23. The apparatus of claim 22 further including a story converter and a binder wherein the status table includes the status of the story converter and the binder for a current job.

24. The apparatus of claim 15 wherein the index generator stores legal requirements associated with the target sites, the legal requirements identifying whether stories can be published on a target site.

25. An apparatus for automatically republishing content to multiple target sites in a customized format for the target sites, comprising:

a database engine located on a source site having stored procedures thereon that map a story stored on the source site into a custom site hierarchy of a target site;

a content export manager in communication with the database engine that receives a republish message for a section on a target site and that invokes one of the stored procedures associated with that section to map stories within the section into the custom site hierarchy of the target site and that generates an index file indicating the stories to be republished;

a difference engine in communication with the content export manager that reads the index file and compares the index file to a master index file indicating stories currently published on the target site, the difference engine generating a difference index file indicating stories from the index file that are new and need to be republished, but does not include stories identified in the index file that are already published on the target site according to the master index file;

a story converter that reads the difference index file and that converts stories stored on the source site and identified in the difference index file into an XML file type and stores the converted stories in a content store; and a binder that reads the content store and that applies style sheets to the stories in the content store to customize the look and feel of the stories for the target site.

26. The apparatus of claim 25 including a validator that reads the content store and ensures that the content store matches the master index file and wherein the binder dynamically builds linking information into the stories using the master index file.

27. A method of republishing content, comprising:

receiving a start message to republish content on an identified target site;

reading a job definition file that associates the identified target site with a stored procedure;

invoking the stored procedure identified in the job definition file;

determining sections and stories to be republished according to a customized site hierarchy of the target site using the stored procedure that is invoked;

generating an index file of the stories determined to be republished;

generating a difference index file that indicates a difference between the index file and a master index file;

converting stories identified in the difference index file to a predetermined type; and combining the stories in the predetermined type with style sheets to customize the arrangement of text and images in the stories for the target site.

28. A republication system, comprising a master index file that identifies stories currently published on a target site and a story store on a source site including stories available for publication and further including a difference engine that determines stories available in the story store for publication that are new or modified from stories identified in the master index file and wherein only stories in the story store identified by the difference engine are republished on the target sites.

29. A republishing system comprising a content store located on a source site and including content to be published to multiple target sites in a customized format and further including a master index file stored on the source site that identifies stories currently published on the target sites and a validator for comparing the stories in the master index to stories in the content store and for deleting any stories in the content store that are not identified in the master index.

30. A republishing system comprising a content store located on a source site and content to be published on multiple target sites in a customized format and further including a master index file stored on the source site that identifies stories currently published on the target sites and a binder that reads the master index file and uses the master index to dynamically build linking information into the stories that reference other stories on the target sites.

* * * * *